United States Patent [19]

Turner

[11] 4,198,009
[45] Apr. 15, 1980

[54] X-RAY FILM CASSETTE

[75] Inventor: George F. A. M. Turner, Ingatestone, England

[73] Assignee: Ciba-Geigy AG, Basel, Switzerland

[21] Appl. No.: 925,723

[22] Filed: Jul. 18, 1978

[51] Int. Cl.² .......................... G03B 17/26; G11B 1/00
[52] U.S. Cl. .................................... 242/71.7; 250/468
[58] Field of Search ................... 242/71.7, 55, 67.1, 242/67.3 R; 250/468, 480, 477, 482

[56] References Cited

U.S. PATENT DOCUMENTS

| | | | |
|---|---|---|---|
| 2,056,279 | 10/1936 | Kulick | 250/480 |
| 2,374,038 | 4/1945 | Ress | 242/55 |
| 3,715,087 | 2/1973 | Schmidt | 242/67.3 R |
| 3,743,200 | 7/1973 | Hommerin | 242/67.3 R |
| 3,784,835 | 1/1974 | Schmidt | 250/480 |
| 3,836,783 | 9/1974 | Stievenart | 250/480 |
| 3,930,165 | 12/1975 | Robinson | 250/480 |
| 3,961,760 | 6/1976 | Arnoldussen | 242/67.3 R |

Primary Examiner—Edward J. McCarthy
Attorney, Agent, or Firm—Harry Falber

[57] ABSTRACT

Day-light loading cassette for film sheets particularly X-ray film sheets, having fixed back and front panels in which the sheet is retained against the front of the cassette by a spring loaded pressure plate which can be released or engaged by a bell crank and roller mechanism set into action by pushing or releasing a spring loaded actuating bar.

10 Claims, 6 Drawing Figures

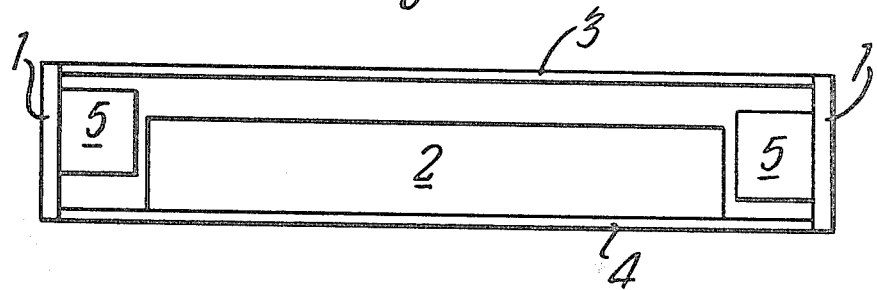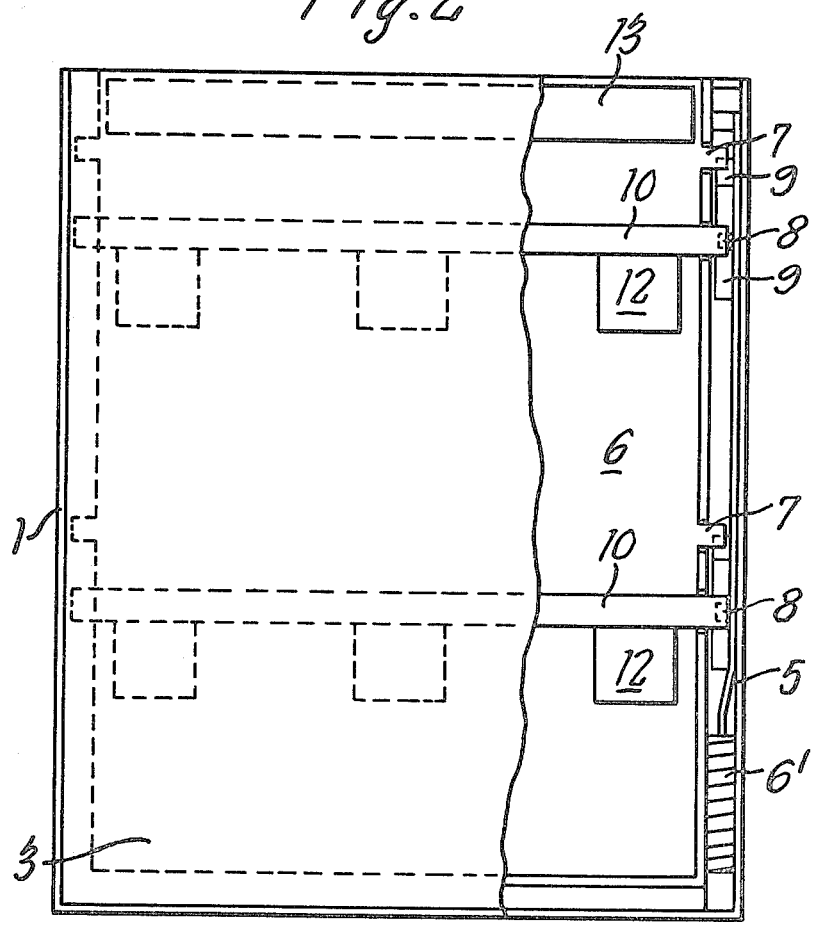

6·1   6·2

X-RAY FILM CASSETTE

This invention relates to a film sheet cassette and in particular to an X-ray film cassette.

X-ray films when they are exposed are usually sandwiched between two X-ray intensifying screens in a flat film cassette. Normally such cassettes are loaded with film and unloaded in the dark manually. However recently schemes have been introduced whereby such cassettes are loaded in a bulk film loader and unloaded in a film processing apparatus, both these operations taking place in daylight conditions without the necessity of locating either the bulk loader or the processor in a dark-room.

It is the object of the present invention to provide a film sheet cassette which can be loaded with a sheet of film by a bulk loader and which can be unloaded straight into a film processor.

Therefore according to the present invention there is provided a film sheet cassette comprising a frame to which is attached a substantially flat back plate and a substantially flat front plate and located there between a pressure plate for resiliently bearing against the said back plate when the cassette is in the closed position but raised from the back plate when the cassette is in the open position, there being present at one end of the frame, slot means for loading or unloading film into or out of the cassette the said pressure plate having connected thereto along each side edge thereof at least one lifting tab, two push rods located one at each side of the frame for linear movement between a first position which corresponds to the cassette closed position and a second position which corresponds to the cassette open position, each push rod having associated therewith at least one round member which in the first position of the push rod rests on one end of a bellcrank member, each round member being located adjacent to a pressure plate lifting tab and a portion at least of the lifting tab being located over the portion of the bellcrank member on which the round member rests, whereby movement of the push rods from the first position to the second position causes the round member to move along the bellcrank members so causing the initially flat portion of the bellcrank member on which the round member rested to be pivoted upwards thus causing the lifting tab on the pressure plate to be raised so opening the cassette, together with light shielding means which prevents the ingress of light between the back plate and the pressure plate when the cassette is closed.

Preferably the pressure plate has on each side edge several lifting tabs connected thereto, there being a like number of round members and bellcrank members adjacent thereto. Most preferably each lifting tab has an equivalent tab on the other side of the pressure plate. Similarly each round member and bellcrank member has a like pair on the other side of the cassette, forming a series of pairs of round members and bellcrank members along each side of the cassette.

The round member may be a roller, ball or wheel. The round member may be caused to rotate when a push rod is moved from the first position to the second position by being rotatably attached to the push rod. In another embodiment the round member is a roller positioned between two locating members attached to the push rod.

Preferably the means for resiliently pressing the pressure plate against the back plate is a number of leaf springs. These leaf springs may be attached to a rod which is so connected to each pair of bellcrank members that when that end of the bellcrank member on which the round member rests in the first position is flat the leaf springs press against the pressure plate urging it against the back plate but when that end of the bellcrank member is pointed upwards the leaf springs no longer press against the pressure plate.

In another embodiment a second bellcrank member is mounted above the round member.

This second bellcrank member is connected by a leaf spring mounting rod to an equivalent second bellcrank member on the other side of the cassette, the leaf springs being attached to the leaf spring mounting rod. Movement of the round member caused by moving the push rod from the first position to the second position causes the second bellcrank member also to pivot and release the leaf springs from urging the pressure plate against the back plate.

In one embodiment an X-ray intensifying screen is mounted on the inside of the back plate and an X-ray intensifying screen is mounted on the underside of the pressure plate, i.e. the side which is urged towards the back plate in the cassette closed state.

Thus the cassette of the present invention comprises a flat frame member having fixed front and back plates and a slot at one end of the frame for inserting or removing the film. This slot is closed by a light shielding means when the cassette is in the closed position but the shielding means is removed from the slot when the cassette is in the open position. Whether the cassette is in the open or closed position depends on the position of the pressure plate which is located in the cassette between the fixed front and back plates. When the pressure plate is urged against the back plate it will hold securely any film which is present on the back plate or on the intensifying screen on the back plate if present.

When the pressure plate is raised from the back plate any film present therebetween can easily be removed by gravity when the cassette is held so that the slot faces downwards. Similarly the cassette can easily be loaded in the cassette open position either by gravity or feeding the film into the cassette by means of rollers or like means.

The cassette is opened and closed by pressing the two push rods. Preferably these rods are spring loaded so causing the cassette to remain in the closed position unless the rods are pressed against the spring means.

The accompanying drawings will serve to illustrate the invention.

FIG. 1 is a side elevation of a film cassette according to the present invention.

FIG. 2 is a top plan elevation of the same film cassette with the front plate sectioned.

Figure 3:
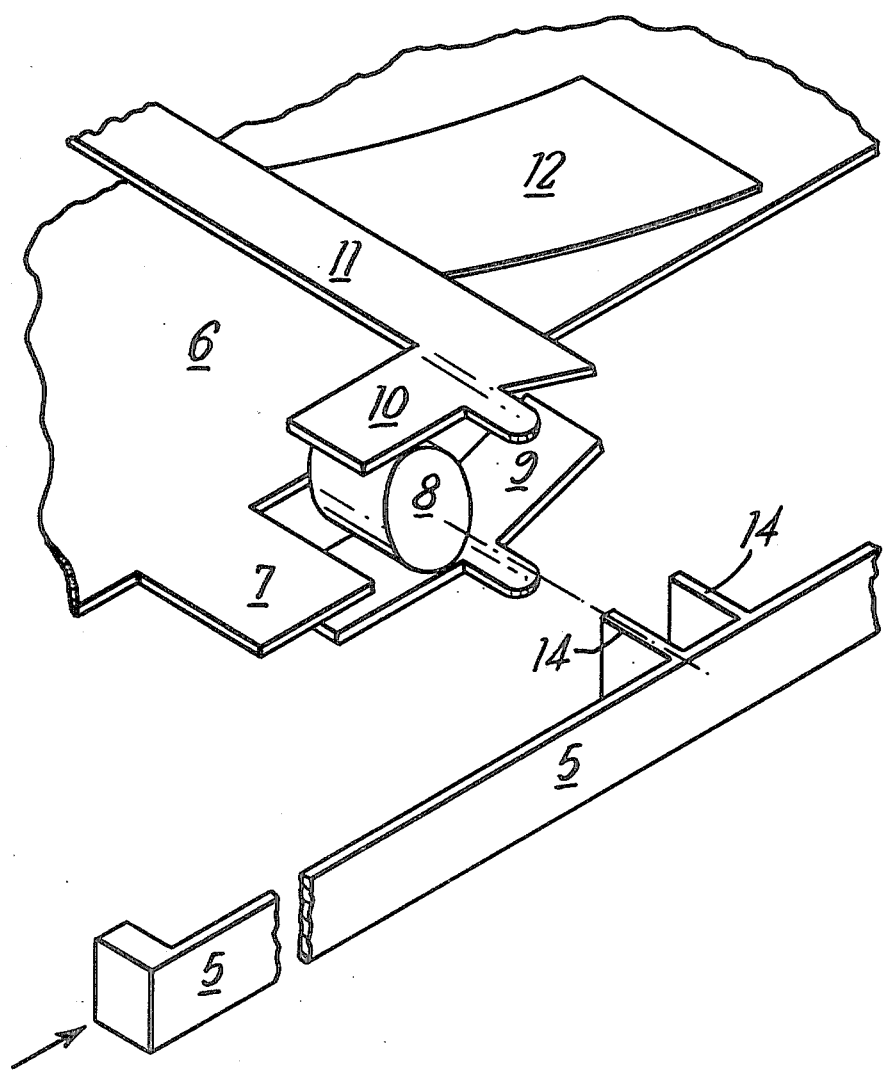
FIG. 3 is an exploded detailed view of the same cassette showing the push rod, associated roller, bellcranks and a lifting tab connected to the pressure plate.

In FIG. 1 the cassette comprises a four sided frame 1 in one end of which is present a slot 2. A front plate 3 and a back plate 4 complete the flat 6-sided cassette. Also shown in this view are the ends of the two push rods 5.

Figure 4:
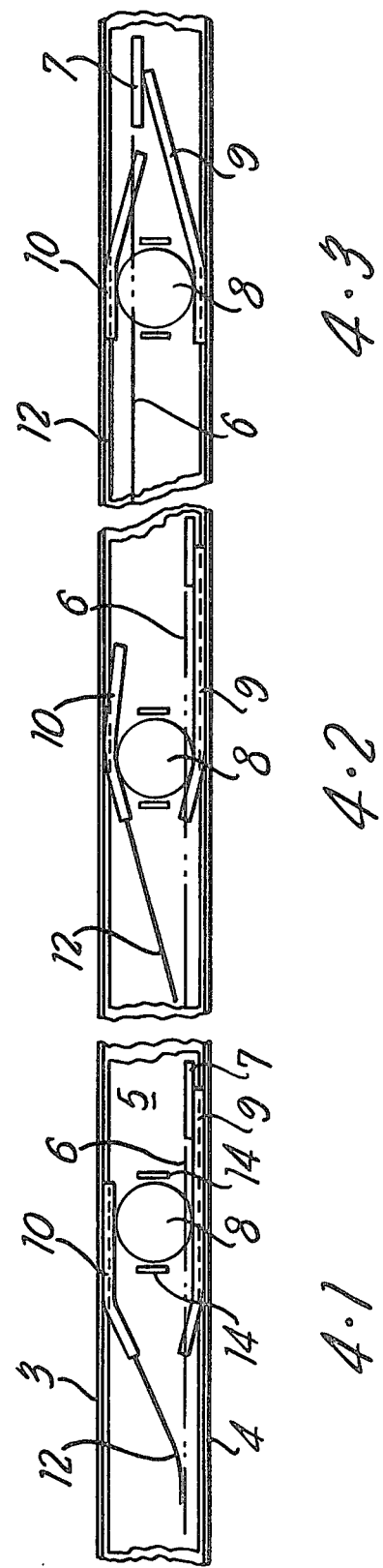
FIG. 4 is a diagrammatic cross-sectional view of three positions of a roller of FIGS. 2 and 3 as it is moved by the push rod.

In FIGS. 2-4 the same numbers have the same signification.

In FIG. 2 all four sides of the frame 1 are shown. However the front plate has been sectioned to show details of one push rod 5. Located at the end of each push rod 5 is a spring 6 (but only one rod and spring is shown in this figure).

Mounted under the front plate 3 is a pressure plate 6. Attached to this pressure plate 6 are a number of lifting tabs 7.

Associated with the push rod 5 are two rollers 8. Each roller 8 rests on a bottom bellcrank member 9 (each end of which is numbered). Above each roller is a top bellcrank member 10. This arrangement is shown in the exploded view of FIG. 3.

Joining each pair of top bellcrank members 10 is a leaf spring mounting bar 11. Attached to each mounting bar 11 are a number of leaf springs 12. There is a light shielding means 13 which prevents the ingress of light into the cassette when the cassette is in the closed position.

In FIG. 3 the location of the roller 8 between the top bellcrank member 10 and the bottom bellcrank member 9 is shown. In this figure the leaf spring 12 attached to the mounting bar 11 is shown pressing down on the pressure plate 6. The roller 8 is shown located adjacent to a lifting tab 7 which is attached to the pressure plate 6.

The push rod 5 is shown withdrawn from its location in the cassette. Attached to the push rod 5 are two roller positioning lugs 14. The roller 8 fits between the lugs 14 and when the push rod 5 is moved the roller is caused to move with the push rod.

In FIG. 4 FIG. 4.1 shows the cassette in the closed position. The roller 8 positioned between the lugs 14 attached to the push rod 5 rests on the longer flat portion of the lower bellcrank member 9. The long flat position of the upper bellcrank member 10 rests on the roller. In this position the leaf springs 12 attached to the rod 11 press down on the pressure plate 6 which is indicated by the dotted line. The lifting tab 7 is located above the flat portion of the bellcrank member 9. This is the first position of the push rod.

In FIG. 4.2 the push rod has moved the roller 8 along the bellcrank members 9 and 10. This has caused the top bellcrank member 10 to pivot slightly which causes the leaf spring 12 no longer to press down on the pressure plate 6.

In FIG. 4.3 the push rod has moved the roller right along the bellcrank members 9 and 10. This has caused the initially flat portion of the lower bellcrank member 9 to pivot upwards. This lifts the lifting tab 7 which lifts the pressure plate 6 to which it is attached. The final position of the pressure plate 6 is shown raised right up from the back plate 4. The push rod 5 is now in the second position and the cassette is open.

Figure 5:
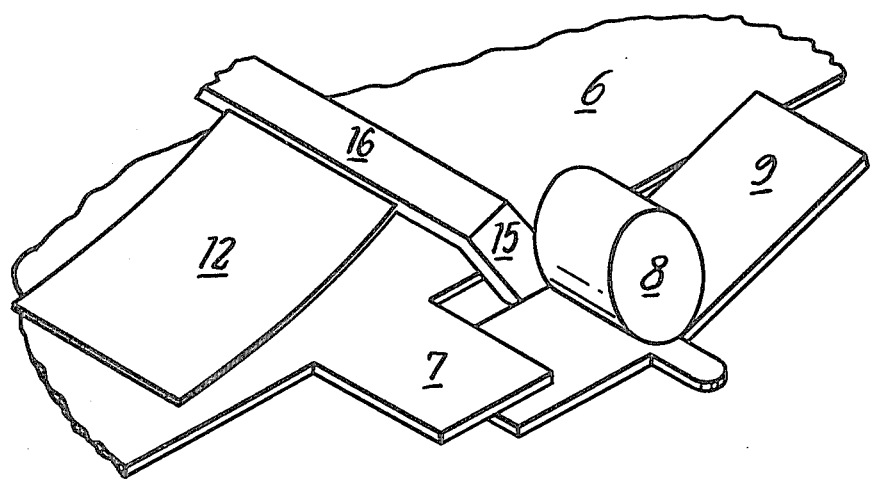
FIG. 5 is a diagrammatic detailed view of part of the cassette and shows an alternative embodiment of a roller having associated with it only one bellcrank member.

In FIG. 5 the numbers 6, 7, 8, 9 and 12 have the same signification as in the earlier figures. In this embodiment which is the same view as FIG. 3 there is attached to the lower bellcrank member a connecting rod 15 which is bent over to form a leaf spring mounting rod 16. This rod is connected to a similar connecting rod on the other side of the cassette (not shown).

Figure 6:
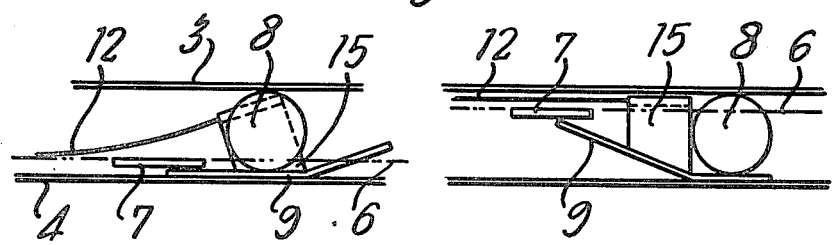
FIG. 6 shows the position of the roller in the open and closed positions of the cassette of FIG. 5.

FIG. 6 shows two positions of the roller 8 in relation to the lower bellcrank member 9. In FIG. 6.1 the cassette is in the closed position. The roller 8 rests on the long flat portion of the bellcrank member 9. In this position the leaf spring 12 presses against the pressure plate 6. In FIG. 6.2 the cassette is in the open position. In this case the roller 8 has been moved so that it causes the longer portion of the bellcrank member 9 to pivot upwards thus lifting the lifting tab 7 and the pressure plate 6 to which the lifting tab is attached. At the same time the leaf spring 12 has been lifted up from pressing against the pressure plate 6. The final position of the pressure plate 6 is shown in this figure.

It is to be understood that the front and back plates 3 and 4 are fixed plates which means that they are not moved or lifted during the unloading or loading operations of the cassette. In fact it is possible to remove both the plates from the frame 1 in order to dismantle the cassette.

In operation the film cassette of the present invention is normally in the closed position with the pressure plate 6 pressed by the leaf springs 7 against the backplate 4. In order to load the cassette with a film it is then inserted in an aperture in a film dispensing apparatus as described for example in our copending application B.P.A. 12180/77 which was filed on 23rd Mar. 1977 or in British Pat. No. 1,361,014. In such dispensing apparatus the end of the cassette is light-sealed in the dispensing aperture. Then two rods press down on the push rods 5 which opens the cassette. A film is then dispensed into the cassette. Then the rods which press on the push rods 5 are withdrawn and the cassette is in the closed position. It can then be removed from the dispenser. In other dispensing apparatus the act of inserting the cassette in the light-sealed aperture opens the cassette and removal from the aperture closes the cassette. The film in the cassette can then be exposed in normal fashion. After exposure the cassette can then be turned so that the slot faces downwards. The cassette is then inserted in a film storage or in a film processing device. The aperture into which it is inserted is also light-sealed. Means then engage the push rods 5 and this causes the cassette to open and the film to fall by gravity to a reception area of the storage device or processing apparatus. The cassette is then closed as it is removed from this device. Both the film dispensing device and the film storage or processing device may be in the day-light condition film exposing room.

What we claim is:

1. A film sheet cassette comprising a frame to which is attached a substantially flat back plate and a substantially flat front plate and located therebetween a pressure plate for resiliently bearing against the said back plate when the cassette is in the closed position but raised from the back plate when the cassette is in the open position, there being present at one end of the frame, slot means for loading or unloading film into or out of the cassette, the said pressure plate having connected thereto along each side edge thereof at least one lifting tab, two push rods located one at each side of the frame for linear movement between a first position which corresponds to the cassette closed position and a second position which corresponds to the cassette open position, each push rod having associated therewith at least one round member which in the first position of the push rod rests on a flat end portion of a bellcrank member, each round member being located adjacent to a pressure plate lifting tab and a portion at least of the lifting tab being located over the portion of the bellcrank member on which the round member rests, whereby movement of the push rods from the first position to the second position causes the round member to move along the bellcrank members so causing the flat portion of the bellcrank member on which the round member rested to be pivoted upwards thus causing the lifting tab on the pressure plate to be raised so opening the cassette, together with light shielding means which prevents the ingress of light between the back plate and the pressure plate when the cassette is closed.

2. A film sheet cassette according to claim 1 wherein the pressure plate has on each side edge several lifting tabs connected thereto, there being a like number of round members and bellcrank members adjacent thereto.

3. A film sheet cassette according to claim 2 wherein each lifting tab has an equivalent tab on the other side edge of the pressure plate.

4. A film sheet cassette according to claim 3 wherein each round member and bellcrank member has a like pair on the other side of the cassette, forming a series of pairs of round members and bellcrank members along each side of the cassette.

5. A film sheet cassette according to any one of claims 1 to 4 wherein the round member is a roller, ball or wheel.

6. A film sheet cassette according to any one of claims 1 to 4 where the pressure plate is resiliently pressed against the back plate by a number of leaf springs.

7. A film sheet cassette according to any one of claims 1 to 4 wherein a second bellcrank member is mounted above the round member.

8. A film sheet cassette according to claim 7 wherein the second bellcrank member is connected by a leaf spring mounting rod to an equivalent second bellcrank member on the other side of the cassette, there being leaf springs attached to the leaf spring mounting rod.

9. A film sheet cassette according to any one of claims 1 to 4 wherein an X-ray intensifying screen is mounted on the inside of the back plate and an X-ray intensifying screen is mounted on the underside of the pressure plate.

10. A film sheet cassette according to any one of claims 1 to 4 wherein the two push rods are spring loaded.

* * * * *